D. A. CLARK AND C. E. LOWE.
PROCESS OF MAKING SHEET METAL TIRE CORES.
APPLICATION FILED JUNE 26, 1918.
1,316,272. Patented Sept. 16, 1919.
4 SHEETS—SHEET 4.
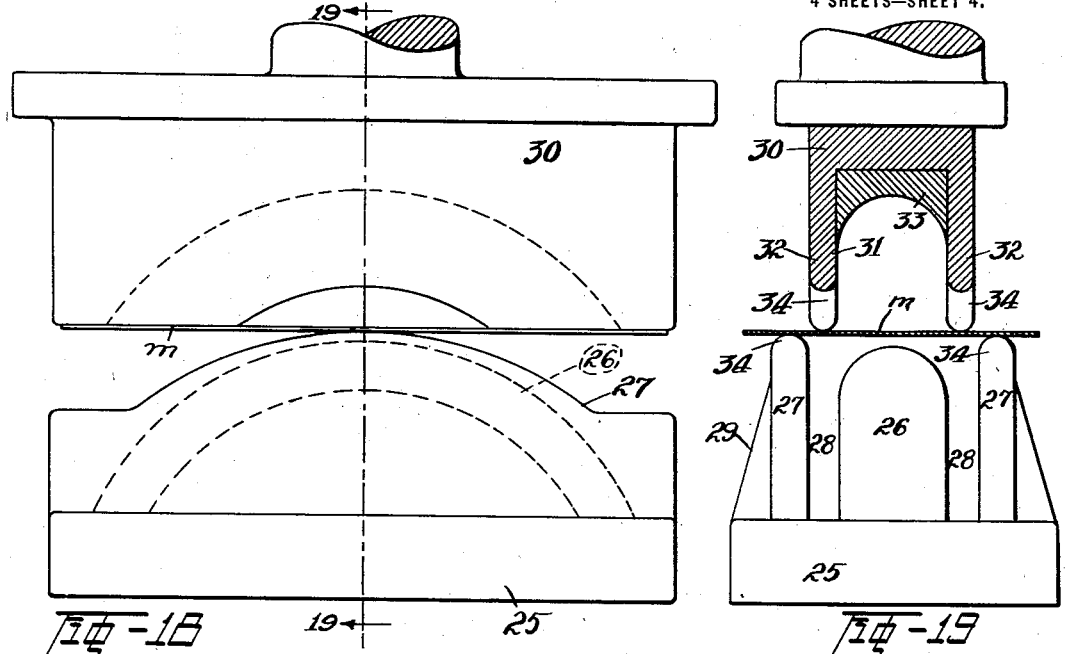
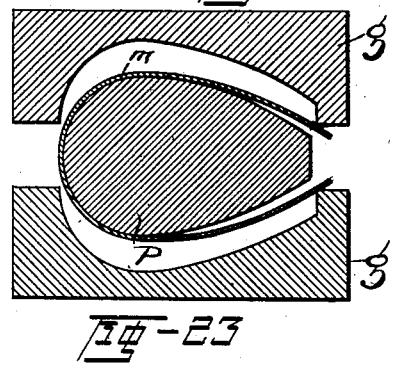
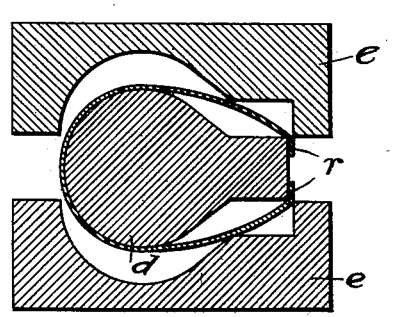
Inventors
Don A. Clark and
Clyde E. Lowe
BY Hull Smith Brack &West Attys.

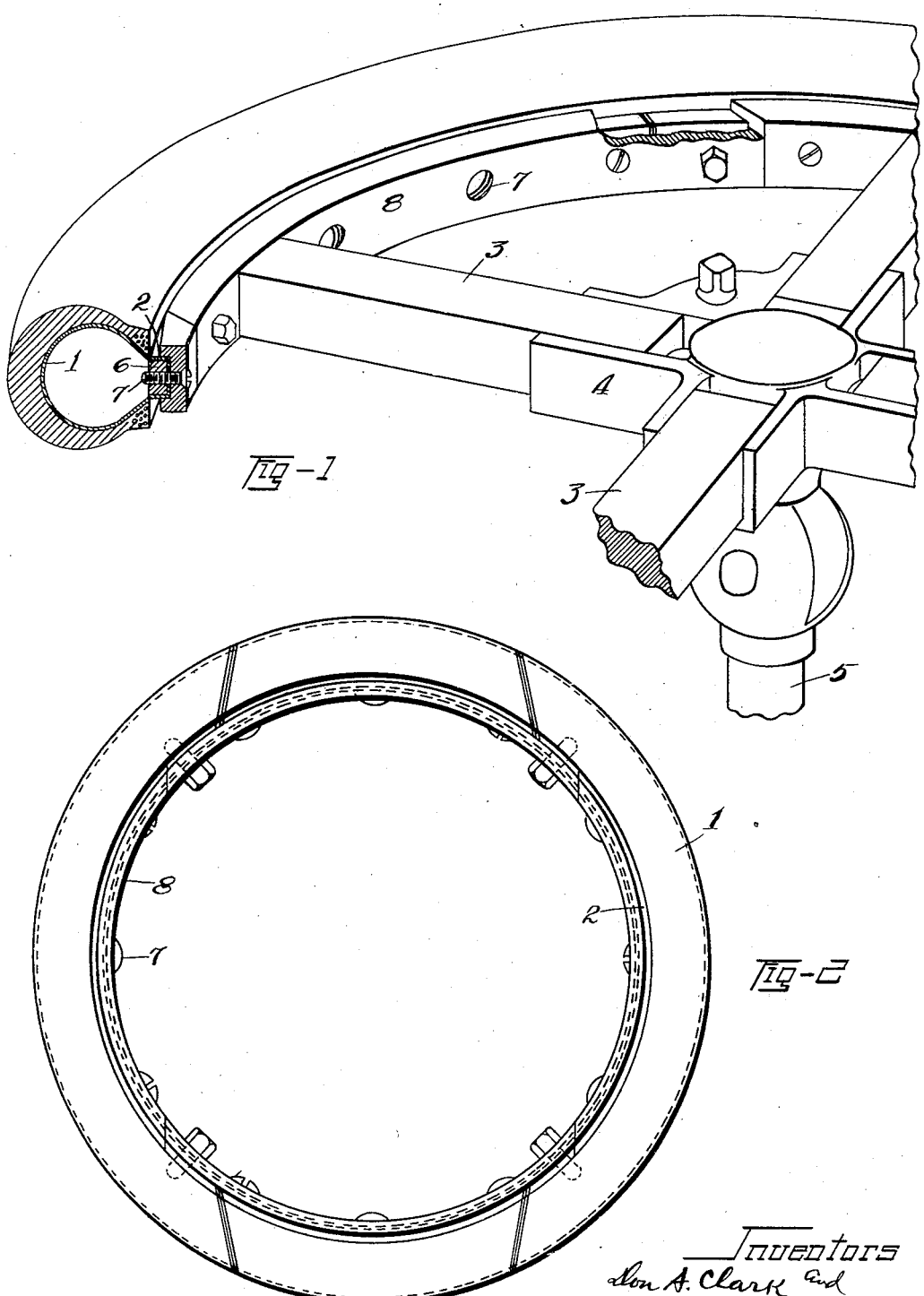

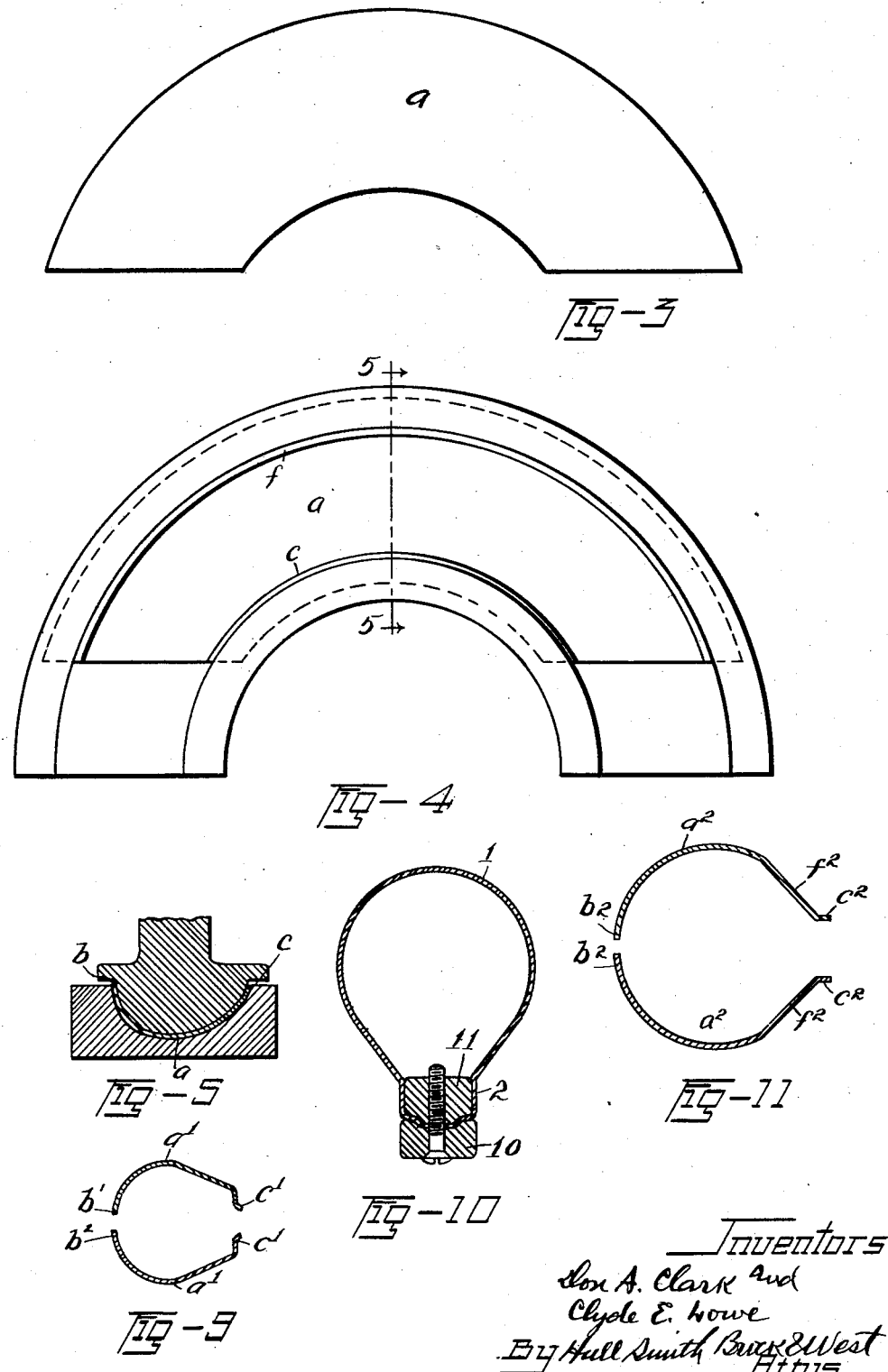

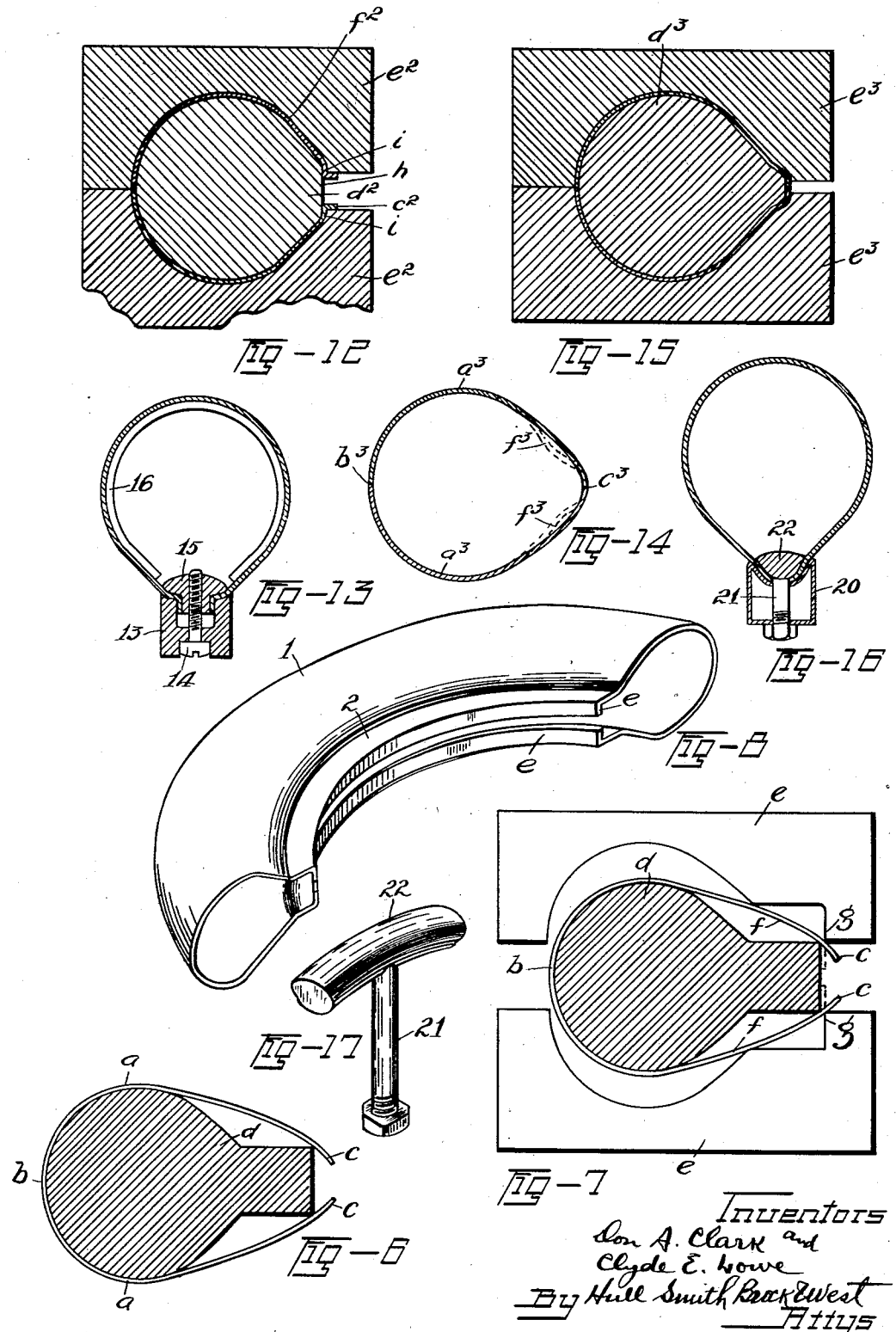

UNITED STATES PATENT OFFICE.

DON A. CLARK AND CLYDE E. LOWE, OF CLEVELAND, OHIO, ASSIGNORS TO THE CLYDE E. LOWE COMPANY, OF CLEVELAND, OHIO, A CORPORATION OF OHIO.

PROCESS OF MAKING SHEET-METAL TIRE-CORES.

1,316,272.          Specification of Letters Patent.      Patented Sept. 16, 1919.

Original application filed October 22, 1917, Serial No. 197,785. Divided and this application filed June 26, 1918. Serial No. 242,019.

*To all whom it may concern:*

Be it known that we, DON A. CLARK and CLYDE E. LOWE, citizen of the United States, residing at Cleveland, in the county of Cuyahoga and State of Ohio, have invented a certain new and useful Improvement in Processes of Making Sheet-Metal Tire-Cores, of which the following is a full, clear, and exact description, reference being had to the accompanying drawings.

This invention relates to a new and improved core for use in the manufacture of pneumatic tires and has for its object the provision of a core of cheaper construction and less weight than any heretofore used, whereby the manufacture of tires can be greatly cheapened by reason of the less expense of the mechanism and greatly facilitated because of the reduction in weight to be transported, as well as considerably expedited because of the smaller heat capacity of the parts. This application is a division of our former application filed October 22, 1917, Serial No. 197,785, wherein we have described and claimed our invention from its aspect as an article, or manufacture; the present application relates to our invention from its aspect as an art or process. The objects of the invention are: the provision of a process whereby tire cores and similar articles can be manufactured from sheet metal; the provision of a process of making a blank from which our improved cores can be assembled; and the provision of an improved blank for use in the construction and manufacture of tire cores; while further objects of our invention will appear as the description proceeds.

In the manufacture of pneumatic tires the interior of the outer casing or "shoe" is formed upon a core of suitable cross section, the body or carcass of this casing being laid thereon either by hand or machine. This core is of annular shape and the tire body is built thereon in the form of an endless ring, the core being meanwhile mounted upon a rotatable hub or supporting chuck in any suitable manner. After the various plies or layers of the tire have been applied in the desired manner the core together with the incomplete article is transferred to the curing ovens for the curing processes, which vary somewhat with different manufacturers, but are similar in that they all contain the employment of heat. After the termination of the curing the parts are allowed to cool and the core removed. In casings having soft or clencher beads the cores are made in one piece (at least in the smaller sizes) and the tire is removed by rolling and stretching thereover; in the case of the straight-wall tires wherein the beads are rendered inextensible by the use of embedded wires or cables it is necessary to employ collapsible cores which can be removed in sections, this being also done in the case of soft-bead tires of large size.

Heretofore it has been necessary to make these cores out of cast metal in order to secure the necessary accuracy. The manufacturing tolerance, in the case of handmade, air cured tires, is as great as plus or minus twenty one-thousandths of an inch, but in machine made, mold-cured tires this tolerance is only plus or minus four one-thousandths inch. In the case of a four inch, mold-cured tire a variation between two cores of .004 inch will entail a difference in rubber cost of approximately one dollar, at present rubber prices. The constructions of these cores of cast metal necessitates a considerable thickness of wall in order to secure good castings of the requisite strength, which renders the device extremely heavy; and in addition each core has to be turned in a boring mill to a rather smooth surface not only to afford the requisite uniformity to the diameter but to prevent the tire fabric from adhering thereto. The machine work and amount of metal thereby required occasion great expense, particularly when one considers the tremendous number of cores required by a tire factory wherein so many cores are all the time tied up in process. In addition the handling of these heavy cores and their transportation from place to place in the factory presents an extremely difficult problem. Moreover the construction of segmental cores in cast metal is so extremely expensive and their weight is so much greater than that of integral cores that the cost of tires made thereon has hitherto been decidedly higher than that of tires made on integral cores, this one item being largely responsible for the difference. Finally the corresponding segments of different cast iron cores are not interchangeable, which fact necessitates great care in keeping the different segments together, and further results in the loss of the entire core in case a single segment becomes injured or misplaced as frequently occurs in the confusion of a large factory.

Numerous attempts have been made to construct a core from sheet metal, since a successful core of this material would require no machine work and hence be far cheaper than the customary cast core, (less than one-fourth when made in large quantities); the difference in cost between the continuous core and the segmental core would be almost entirely obviated so that straight side tires would cost little, if any, more than soft bead tires, and the soft bead tires themselves could, if desired, be made on collapsible cores; and, most important of all, the weight of each core would be reduced about eighty per cent., greatly facilitating and cheapening the production of all tires. Heretofore the cores made from sheet metal have been weak, flimsy, irregular and so far outside of the tolerance limitations as to be worthless. Our invention provides a method whereby these cores can be made with all the rigidity and strength of cast metal and well within the tolerance limits, together with improved means of stiffening, reinforcing, and assembling the same whereby these advantages are preserved.

In the drawings accompanying and forming a part of this application we have illustrated a few of the preferred steps concerned in the performance of our improved process, which illustrations, taken in conjunction with the following descriptions will, it is believed, render the invention clear to those skilled in the art; although it will be understood that these drawings and descriptions are merely illustrative and do not limit us to the particular steps or mechanisms therein disclosed except as the same are specifically recited in the claims hereto annexed. In these drawings Figure 1 represents partly in section and partly in perspective a tire core supported in its operative position and having a partially completed tire thereon; Fig. 2 is a plan view of a completed core of a sectional type constructed in accordance with our invention and ready for the reception of the tire; Fig. 3 is a plan view of one of the metal sheets from which a core blank is made; Fig. 4 represents a plan view of the female die employed in making the core blank; Fig. 5 represents a cross-sectional view of the die together with the mandrel employed therewith; Fig. 6 represents a cross-sectional view of the forming mandrel with the blank in place thereon; Fig. 7 represents the forming dies at the beginning of their finishing stroke upon the assemblage shown in Fig. 6; Fig. 8 is a perspective view of the sheet metal body after the operation indicated in Fig. 7; Fig. 9 illustrates two blanks of slightly modified form presented to each other prior to welding; Fig. 10 is a cross-sectional view of a completed core showing one of the many possible modes of securing the sheet metal bodies in place; Fig. 11 illustrates another modified shape of blank; Fig. 12 illustrates the step of forming into finished shape the blanks in Fig. 11; Fig. 13 illustrates one of the many convenient modes of securing together into a completed core the bodies formed as shown in Fig. 12; Fig. 14 illustrates another shape of blank; Fig. 15 illustrates the mode of drawing to finished form the blank shown in Fig. 14; and Fig. 16 illustrates one of the many convenient modes of securing together the bodies so formed; Fig. 17 illustrates one of the clamping members employed in Fig. 16; Figs. 18 and 19 are respectively side and sectional views of a punch and die construction conveniently used in making core bodies according to another modification of our invention; Fig. 20 illustrates a flat sheet adapted to be used in connection with the said punch and die; Fig. 21 is a side illustration and Fig. 22 is a cross-sectional view of an incomplete blank as formed by the dies shown in Figs. 18 and 19; Fig. 23 illustrates the said incomplete blank upon the intermediate mandrel and in the act of receiving the intermediate stroke; and Fig. 24 shows the blank after the completion of the operation shown in Fig. 23 and in position to receive the final forming stroke.

According to present established practice a tire core consists as shown in Fig. 1 of a substantially torus-shaped body, having a transversely rounded part 1 and an inwardly projecting rectangular part or rib 2 formed with flat sides. The tire casing is built upon the rounded portion by laying thereon the necessary plies of fabric, cord, rubber, etc., the edges being cut by a knife along the line defined by the junction of these flat and rounded portions. The flat portion or rib constitutes a means of support and also of gaging the distance between the tire beads.

In use the core is supported in some convenient manner, such, for example, as shown in Fig. 1, by attachment to the expanding spokes 3 of a chuck 4, pivoted upon an adjustable spindle 5, whereby the device can be set in any convenient position for manipulation. In this connection we have illustrated one of our sectional sheet metal cores, but it will be understood that we do not limit ourselves to sectional cores or to any one method of mounting, since either this core or any other core herein shown can be mounted and manipulated either this way or any other way known to the art.

According to our invention the rib may either be made from sheet metal and integral with the rounded portion, as shown in Figs. 1 to 9 inclusive; or it may be partly of sheet metal integral with the rounded portion, as shown in Fig. 10, the remainder being a separate part; or it may be wholly separate from the rounded sheet metal parts as shown in Figs. 11 to 16 inclusive; and it may be either of rolled metal, cast metal, or sheet metal.

The essence of our invention consists in this, that the sheet metal constituting the core, whether made from one part or many parts, is first formed nearly to the desired cross-section and size, and all steps of welding, brazing, punching, and shearing, and the like violent operations are completely formed thereon; after which by the use of suitable dies and mandrels the bodies are brought to the requisite shape, size and dimensions by means of a single blow whereby the metal is simultaneously drawn to the finished form and given a permanent mechanical set, thereby overcoming all strains and unevenness caused by the prior operation and producing a device of perfect uniformity, smoothness, and freedom from tendency to wrinkle or warp.

First taking for example a case wherein the rib is to be made integral with the side walls, we may take a metal sheet of substantially the shape shown in Fig. 3 and by means of the dies shown in Figs. 4 and 5 strike the same into the approximate shape shown in Fig. 5 between the two die members, thus producing an arcuate channel member having a rounded body portion $a$ having parallel margins $b$ and $c$. The wall adjacent the margin $b$ is preferably substantially prependicular to the plane of the margins of the channel, while that adjacent to the margin $c$ is preferably inclined. We next weld together the margins $b$ of two similar blanks, and insert into the hollow body thus formed an arcuate mandrel $d$ (see Fig. 7) the margins $c$—$c$ of the original bodies being left loose. This looseness is not imperative; in fact these two margins can, if desired, be turned inwardly, and can even be welded together; but when welded it is more difficult to insert the mandrel $d$, while if the margins are left as shown in Fig. 7 the manufacture is much facilitated and the completed core is equally satisfactory.

The blank is finally given a finishing stroke between the dies $e$—$e$ shown on Fig. 7, which stretches the side walls of the blank at the point $f$—$f$ so as to afford to the metal a positive set and overcoming all irregularities due to heat-warping caused by the welding. The finished body is illustrated in Fig. 8. The dies $e$—$e$, being formed with abrupt shoulders at $g$—$g$ the engagement of these shoulders with the blank binds the margins $c$—$c$ against the abrupt face $h$ of the mandrel thus preventing the slipping of the same and so necessitating the drawing action indicated. In case the margins $c$—$c$ are left flaring outwardly as shown in Fig. 7, the first effect of these shoulders is to bend the same inwardly, exactly the same as though they were bent inwardly in the first place by the action of the original dies.

This action produces a hollow body of the shape and character first above described, and a plurality of such bodies assembled rigidly end to end constitute the completed core. Such assembly may be effected in numerous ways, as described and claimed in the parent application above identified, the simplest mode being that of locating inside the rib 2 an arcuate filler member 6, clamped by suitable screws 7 to a suitable rigid ring member 8. The filler members are necessarily segmental, but the ring 8 may be either segmental or integral depending upon the type of core desired. This clamping action, being effected without the need for welding, brazing, punching, or otherwise distorting the sheet metal bodies, it is found that cores of great uniformity, accuracy and strength are produced.

In Fig. 9 we have shown a slightly different mode of treatment wherein the blanks $a'$, $a'$ are formed at one side with abrupt margins $b'$—$b'$ as before and with other margins $c'$—$c'$ which are first turned abruptly inwardly and then obliquely outward. The margins $b'$—$b'$ are welded together as before and the device set to final shape over a mandrel of the same shape as shown in Figs. 6 and 7, resulting in a hollow body of the cross-sectional shape shown in Fig. 10. A plurality of these bodies are then assembled and secured end to end around a rigid circular ring 10 preferably made integral, and coöperating with suitable filler members 11 as before. This construction is peculiarly applicable to small size cores adapted for machine productions, although it will be seen that the process of making the same is exactly the same as that first described.

In Fig. 11 we have shown blanks $a^2$—$a^2$ as formed at the one margin $b^2$—$b^2$ with perpendicular walls, and at the other margin with inclined walls $f^2$—$f^2$ terminating in abrupt lateral lips $c^2$—$c^2$. The margins $b^2$—$b^2$ having been first welded together, the body is placed on a mandrel $d^2$—as shown in Fig. 12, and struck between dies $e^2$—$e^2$, forming a body of the cross-section shown in Fig. 13. The particular characteristic of this mandrel is the provision of a flat transverse surface at $h$, the dies being formed with a slight shoulder at $i$, whose function it is to catch the lips $c^2$ and draw them toward each other thereby producing a strain or set in the metal at the point $f^2$. While numberless modes of assembling these bodies could be employed, we prefer to clamp them end to end upon the exterior of a suitably channeled ring 13 by means of screws 14 engaging an internal filler member 15 which conforms to the shape of the bodies adjacent thereto. In this view we have shown an internal sleeve 16 arranged to overlap the joint between adjacent sections which constitutes one of the many expedients whereby those sections can be held fixedly in alinement with each other.

According to another embodiment of our invention we may form a pair of blanks $a^3$—$a^3$ as shown in Fig. 14, welding them together at the margins $b^3$—$c^3$ so as to form a body having an ovate cross-section. Into this body we then insert a mandrel $d^3$ of the shape shown in Fig. 15, and strike the same between the finishing dies $e^3$—$e^3$, the shape of the dies and mandrel being such as to stretch the metal at the points $f^3$—$f^3$ to the shape shown in dotted lines in Fig. 14 and in full lines in Fig. 15. This produces a hollow arcuate body of the cross-sectional shape shown in Fig. 16 which is then secured to the exterior of a suitable rigid ring 20, which may be either of cast metal, or rolled or sheet metal, but is here shown as of sheet metal. This is a peculiarly strong section owing to its complete tubular form. The tube sections are secured to the ring in any suitable manner as by radial bolts 21 having elongated rigid heads 22 which conform to the interior of the body.

In all the foregoing modifications we have started with two arcuate channel-blanks, welding them together at their outer peripheries at least and sometimes also at their inner peripheries;- we may, however, form a body from a single sheet of metal without necessity for any welding whatever, and in Figs. 18 to 24 inclusive of these drawings, we have shown the preferred method for accomplishing this. In this operation the flat blank is first drawn immediately into the form of an arcuate trough having a short lateral curvature and a more gradual longitudinal curvature. So far as our present invention is concerned, the particular mode of drawing this trough is not important, but in order to secure a perfectly smooth blank we preferably form the same by means of dies constructed approximately as shown in Figs. 18 and 19.

The fixed member of this die consists of a base 25 having thereon a central boss 26 and two side bosses 27—27, the latter spaced from the central boss to provide recesses 28—28. The boss 26 has the lateral and longitudinal curvature desired to be given to the finished blank, while the bosses 27—27 are merely wings to hold the margins of this blank and prevent wrinkling during the drawing operation. The exteriors of the bosses 27—27 are preferably stiffened by buttresses or flanges 29.

The movable member of this die consists of a block 30 having a channel 31 therein complementary to the boss 36 and defined by depending side walls 32—32 adapted to enter the recesses 28—28. The base of the channel 31 is shown as formed of an independent inserted member 33, though this is merely for manufacturing convenience and is not essential. The tops of the bosses 27 and walls 32 are preferably rounded transversely as shown at 34—34.

A blank $m$ being used between these die members as shown and the die members being brought together, a reverse double drawing operation takes place as will be well understood by those skilled in the art, resulting immediately in the production of a channel member shown in Figs. 21 and 22. The channels are generally somewhat ragged as shown at $n$—$n$ and have to be sheared away. A mandrel $p$ is then introduced to this blank, and the blank is closed upon the same by means of the dies $g$—$g$, which draw together the side walls of the same as shown in Fig. 23, and also, preferably, turn inwardly the free edges of that channel to the shape shown at $r$—$r$ in Fig. 24. The formation of these inturned lips at 39, while not important to the subsequent operation, serves to hold the blank in the position to which it is drawn by the dies $g$—$g$, and prevents the sides from springing apart upon the removal of the dies.

The mandrel $p$ is now replaced by the mandrel $d$ as shown in Fig. 24 (which may be and generally is an exact duplicate of the mandrel $d$ shown in Fig. 7) and the finishing blow is given by dies $e$—$e$ as before.

After the hollow bodies are attached to the periphery of the supporting ring an integral core is produced which can thereafter be sawed into sections in case a segmental core be desired; or the core sections can first be cut to the desired length and shape and subsequently assembled. All the sections are exactly alike in shape and size and can be interchanged at will, while the injury or loss of any section does not entail the loss of the entire core as was the case with the cast iron article.

By our invention we are enabled to make not only cores of the accuracy necessary for air cured tires, namely a tolerance of about twenty one-thousandths of an inch but also of the accuracy necessary for mold cured tires, namely a tolerance of less than .004 inch. However, we do not limit ourselves to the exact details of construction, design, or manipulation therein described since the same may be varied widely within the scope of our invention as defined in the annexed claims.

Having thus described our invention, what we claim is:—

1. The process of making a tire-forming core which includes the steps of first forming a hollow curvilinear sheet-metal body having the transverse circumference of the metal body less than that of the finished core, and afterward stretching the metal to the desired circumference simultaneously with shaping the exterior to the finished form.

2. The process of making a tire-forming core which includes the steps of first forming a hollow curvilinear sheet-metal body having its interior dimensions larger than the finished core and the transverse circumference of the metal body less than that of the finished core, and afterward stretching the metal to the desired circumference simultaneously with reducing the interior to the shape and dimensions of the finished article.

3. The process of making from sheet metal a torus-shaped tire-forming core having an inwardly projecting rectangular rib, which includes the steps of constructing a one-piece arcuate blank having a torus-shaped body formed with an inwardly-projecting inclined-sided portion, introducing a grooved arcuate mandrel into said blank, and striking said blank in forming dies whereby at a single blow the inclined portions of said blank are forced into the mandrel grooves, stretching the metal and placing the same under constant tension.

4. The process of making from sheet metal a torus-shaped tire-forming core having an inwardly projecting rectangular rib, which consists in constructing an arcuate hollow body of sheet metal possessing the approximate shape of the core section but having a transverse periphery less than that of the finished core, stretching said metal to the required dimension and forcing it to the required shape by means of a single blow, and afterward clamping said section in a uniform manner to a supporting and strengthening base.

5. The process of forming a collapsible tire core which includes the steps of producing a continuous integral circular metal ring, attaching to said ring a plurality of hollow sheet metal bodies of requisite cross-section, fitting to close alinement the abutting ends of said bodies, and finally severing said ring and separating said bodies into the requisite number of segments.

6. The process of making a tire-forming core which includes the steps of first forming a hollow curvilinear sheet metal body having its interior dimensions greater and its transverse circumference less than the finished core, second inserting into the body a grooved mandrel, and third, pressing said body in forming dies whereby the internal dimensions of the body are reduced and the walls stretched by being forced into the grooved mandrel.

7. The process of making a tire-forming core which includes the steps of first forming from a sheet of metal a blank having the approximate shape of one half of the completed core, the transverse periphery of the blank being less than that of the corresponding portion of the finished core, second, welding two such blanks together at their edges, and, third, stretching the metal laterally into the completed form whereby it is left in a state of tension.

8. The process of making a rigid hollow body of sheet metal which consists of forming a plurality of independent sheet metal members, welding the same together into a structure having the approximate shape of the finished body but with walls of less linear extent, and finally stretching the metal of the walls to the desired dimensions simultaneously with forming the entire body to the finished shape.

9. The process of building up a hollow rigid sheet metal article from a plurality of sheet metal blanks which consists of first drawing the blanks to channel form, second, assembling a plurality of said blanks together to produce a hollow body approximately the size and shape of the article desired, next welding together the meeting edges of said blanks, and finally reducing said body to completed size and shape by a single blow whereby the metal is stretched and placed under continuous tension.

10. In the process of making a tire forming core by welding and stamping from sheet metal, the art which consists in performing all welding operations prior to bringing the sheet metal to its final form, and then bringing the same to such final form at all points simultaneously as by a single blow between dies, whereby the welding strains are overcome and a permanent set given to the body.

11. The process of building up a rigid sheet metal article from a plurality of sheet metal blanks which consists of first drawing the blanks into channel form, second, assembling said blanks together to form a body approximately the shape of the article desired, next welding together the meeting edges of the blanks, clamping securely the opposite edges, and stretching the intermediate metal to the exact shape and size desired by means of a single blow.

12. The process of making a tire forming mandrel which includes the steps of first welding together a plurality of curvilinear, channel-shaped blanks to produce a hollow curvilinear body whose longitudinal curvature is substantially the same as that of the completed mandrel and whose transverse periphery is different from that of the completed mandrel, and afterward forcing the metal to the desired circumference by a pressure greater than the elastic limit of the metal whereby the welding strains are overcome.

In testimony whereof, we hereunto affix our signatures.

DON A. CLARK.
CLYDE E. LOWE.